(12) United States Patent
Takeuchi

(10) Patent No.: US 10,262,254 B2
(45) Date of Patent: Apr. 16, 2019

(54) INFORMATION PROCESSING APPARATUS, INFORMATION PROCESSING METHOD, AND PROGRAM

(71) Applicant: SONY CORPORATION, Tokyo (JP)

(72) Inventor: Yasuo Takeuchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/519,431

(22) PCT Filed: Sep. 15, 2015

(86) PCT No.: PCT/JP2015/076111
§ 371 (c)(1),
(2) Date: Apr. 14, 2017

(87) PCT Pub. No.: WO2016/063659
PCT Pub. Date: Apr. 28, 2016

(65) Prior Publication Data
US 2017/0243105 A1 Aug. 24, 2017

(30) Foreign Application Priority Data
Oct. 22, 2014 (JP) .................................. 2014-215764

(51) Int. Cl.
*G06K 19/06* (2006.01)
*G06K 19/077* (2006.01)
(Continued)

(52) U.S. Cl.
CPC ..... *G06K 19/07741* (2013.01); *G06F 21/445* (2013.01); *G06Q 20/3229* (2013.01);
(Continued)

(58) Field of Classification Search
CPC ............ G06K 19/07749; G07F 7/1008; G06Q 20/341
(Continued)

(56) References Cited

U.S. PATENT DOCUMENTS

2004/0256470 A1* 12/2004 Takami ............... H04L 63/0464
235/492
2007/0283415 A1* 12/2007 Kurita .................. G06Q 20/341
726/2
(Continued)

FOREIGN PATENT DOCUMENTS

JP 2004-349754 A 12/2004
JP 2005-242445 A 9/2005
(Continued)

OTHER PUBLICATIONS

Office Action for JP Patent Application No. 2016-555134, dated Dec. 4, 2018, 3 pages of Office Action.

*Primary Examiner* — Ahshik Kim
(74) *Attorney, Agent, or Firm* — Chip Law Group

(57) ABSTRACT

Provided is an information processing apparatus including an access control unit configured to control access from an application to a common file system accessible from a plurality of applications. The access control unit in a case where contact communication is performed with respect to an external processor, controls access by using first identification information for specifying an application, the first identification information being associated with each of the plurality of applications, and in a case where contactless communication is performed via a contactless communication device capable of performing contactless communication with an external device, controls access by using second identification information for specifying an application related to contactless communication, the second identification information being associated with at least one application among the plurality of applications.

8 Claims, 13 Drawing Sheets

(51) Int. Cl.
*G06F 21/44* (2013.01)
*G06Q 20/32* (2012.01)
*G06Q 20/34* (2012.01)
*G06Q 20/36* (2012.01)

(52) U.S. Cl.
CPC ... *G06Q 20/3278* (2013.01); *G06Q 20/35765* (2013.01); *G06Q 20/363* (2013.01)

(58) Field of Classification Search
USPC ......................................................... 235/492
See application file for complete search history.

(56) References Cited

U.S. PATENT DOCUMENTS

| | | | |
|---|---|---|---|
| 2008/0000989 A1* | 1/2008 | Chen ................ | G06K 19/07 235/492 |
| 2012/0024964 A1* | 2/2012 | Lee ................ | G06K 19/07733 235/492 |
| 2012/0298747 A1* | 11/2012 | Mestre ................ | G06Q 20/354 235/380 |

FOREIGN PATENT DOCUMENTS

| JP | 2012-010207 A | 1/2012 |
|---|---|---|
| JP | 2012-190454 A | 10/2012 |
| JP | 2013-526734 A | 6/2013 |

* cited by examiner

FIG. 8

| # | SC | IDm | PMm | |
|---|---|---|---|---|
| 1 | 1234 | xxxxxxxxxxxxxxxx | yyyyyyyyyyyyyyyy | |
| 2 | | | | ⎫ |
| 3 | | | | ⎬ UNUSED |
| 4 | | | | ⎭ |

FIXED VALUE | NUMBERING CAN BE PERFORMED BY BUSINESS OPERATOR (6 BYTES)

FIXED VALUE | RANDOM NUMBER (6 BYTES)

INFORMATION PROCESSING APPARATUS, INFORMATION PROCESSING METHOD, AND PROGRAM

CROSS REFERENCE TO RELATED APPLICATIONS

This application is a U.S. National Phase of International Patent Application No. PCT/JP2015/076111 filed on Sep. 15, 2015, which claims priority benefit of Japanese Patent Application No. JP 2014-215764 filed in the Japan Patent Office on Oct. 22, 2014. Each of the above-referenced applications is hereby incorporated herein by reference in its entirety.

TECHNICAL FIELD

The present disclosure relates to an information processing apparatus, an information processing method, and a program.

BACKGROUND ART

A technique for accessing an application via a plurality of different communication channels has been developed. The technique for accessing an application via a plurality of communication channels is, for example, a technique disclosed in Patent Literature 1 cited below.

CITATION LIST

Patent Literature

Patent Literature 1: JP 2012-10207A

DISCLOSURE OF INVENTION

Technical Problem

For example, in the technique disclosed in Patent Literature 1, a dummy application ID (AID) is assigned to an application that does not actually exist and a service is managed by using the dummy AID. However, a method of accessing an application via a plurality of different communication channels to perform processing is not limited to a method disclosed in Patent Literature 1.

The present disclosure proposes an information processing apparatus, an information processing method, and a program, each of which is new, is improved, and is capable of controlling access from an application to a common file system in accordance with a communication channel.

Solution to Problem

According to the present disclosure, there is provided an information processing apparatus including an access control unit configured to control access from an application to a common file system accessible from a plurality of applications. The access control unit in a case where contact communication is performed with respect to an external processor, controls access by using first identification information for specifying an application, the first identification information being associated with each of the plurality of applications, and in a case where contactless communication is performed via a contactless communication device capable of performing contactless communication with an external device, controls access by using second identification information for specifying an application related to contactless communication, the second identification information being associated with at least one application among the plurality of applications.

According to the present disclosure, there is provided an information processing method executed by an information processing apparatus, including a step of controlling access from an application to a common file system accessible from a plurality of applications. In the controlling step, in a case where contact communication is performed with respect to an external processor, access is controlled by using first identification information for specifying an application, the first identification information being associated with each of the plurality of applications, and in a case where contactless communication is performed via a contactless communication device capable of performing contactless communication with an external device, access is controlled by using second identification information for specifying an application related to contactless communication, the second identification information being associated with at least one application among the plurality of applications.

According to the present disclosure, there is provided a program causing a computer to execute a step of controlling access from an application to a common file system accessible from a plurality of applications. In the controlling step, in a case where contact communication is performed with respect to an external processor, access is controlled by using first identification information for specifying an application, the first identification information being associated with each of the plurality of applications, and in a case where contactless communication is performed via a contactless communication device capable of performing contactless communication with an external device, access is controlled by using second identification information for specifying an application related to contactless communication, the second identification information being associated with at least one application among the plurality of applications.

Advantageous Effects of Invention

According to the present disclosure, it is possible to control access from an application to a common file system in accordance with a communication channel.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is an explanatory diagram for describing an example of the information processing method according to the embodiment.

MODE(S) FOR CARRYING OUT THE INVENTION

Hereinafter, preferred embodiments of the present disclosure will be described in detail with reference to the appended drawings. In this specification and the drawings, elements that have substantially the same function and structure are denoted with the same reference signs, and repeated explanation is omitted.

Hereinafter, the description will be provided in the following order.
1. Information processing method according to embodiment
2. Information processing apparatus according to embodiment
3. Program according to embodiment
(Information Processing Method According to Embodiment)

An information processing method according to this embodiment will be described. Hereinafter, a case where processing related to the information processing method according to the embodiment is performed by an information processing apparatus according to the embodiment will be described as an example.

[1] Hardware configuration example and software configuration example of information processing apparatus according to embodiment capable of performing processing related to information processing method according to embodiment Before description of the information processing method according to the embodiment, there will be described a hardware configuration example and a software configuration example of the information processing apparatus according to the embodiment capable of performing processing related to the information processing method according to the embodiment.

Figure 1:
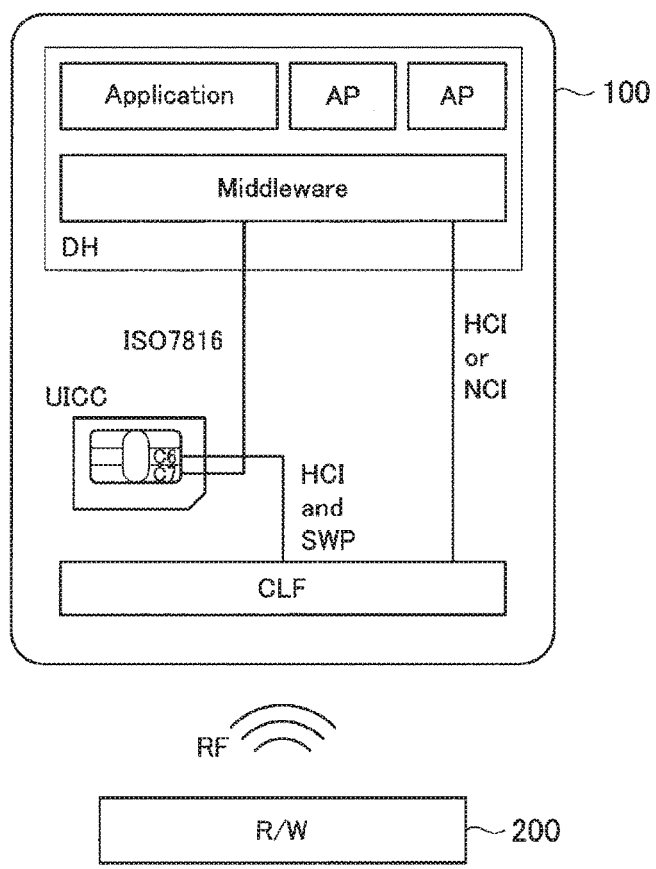
FIG. 1 is an explanatory diagram showing an example of a hardware configuration of an information processing apparatus according to this embodiment.

[1-1] Hardware Configuration Example of Information Processing Apparatus According to Embodiment FIG. 1 is an explanatory diagram showing an example of a hardware configuration of an information processing apparatus 100 according to the embodiment. FIG. 1 also shows a reader/writer 200 (denoted by "R/W" in FIG. 1) for performing contactless communication with the information processing apparatus 100.

Herein, the contactless communication according to the embodiment is, for example, near field communication (NFC) for performing communication with the use of a magnetic field (carrier wave) having a predetermined frequency such as 13.56 [MHz]. Hereinafter, a case where the contactless communication according to the embodiment is NFC will be described as an example.

The information processing apparatus 100 includes, for example, a universal integrated circuit card (UICC), a contactless front end (CLF), and a device host (DH).

FIG. 1 shows an example where the UICC and the CLF communicate with each other via, for example, communication interfaces called host controller interface (HCI) and single wire protocol (SWP) and the UICC and the DH communicate with each other via, for example, a communication interface based on the ISO7816 standard. In other words, FIG. 1 shows an example where the UICC communicates with the CLF and the DH via two different communication channels.

Further, FIG. 1 shows an example where the CLF and the DH communicate with each other via a host controller interface (HCI) or an NFC controller interface (NCI).

Note that the communication interfaces between the UICC, the CLF, and the DH are not limited to the above examples. For example, the UICC and the CLF may communicate with each other via a communication interface called dual wire protocol (DWP) instead of the SWP shown in FIG. 1. For example, the DH (external processor described below) and the UICC can perform indirect contact communication via another component, such as DH-CLF-UICC.

The UICC mainly performs processing related to the information processing method according to the embodiment. By performing the processing related to the information processing method according to the embodiment, the UICC changes how to perform access control between, for example, a case of performing contact communication (for example, communication based on ISO7816 shown in FIG. 1) with the DH (external processor described below) and a case of performing contactless communication via the CLF (contactless communication device). A specific example of the processing related to the information processing method according to the embodiment will be described below.

The UICC includes, for example, a processor made up of a micro processing unit (MPU), various processing circuits, and the like, and the processing related to the information processing method according to the embodiment is mainly performed by the processor.

Further, the UICC may also include a recording medium capable of storing, for example, an application (hereinafter, referred to as "AP" or "applet" in some cases) and various kinds of data. The recording medium included in the UICC has, for example, tamper resistance.

Note that a component capable of mainly performing the processing related to the information processing method according to the embodiment is not limited to the UICC. For example, the component capable of mainly performing the processing related to the information processing method according to the embodiment may be a "subscriber identity module (SIM)", an "eUICC" (in a case where the UICC shown in FIG. 1 is not detachable), or an "eSE" (in a case where the UICC shown in FIG. 1 is not detachable and information necessary to connect to a general public wireless network is not stored).

The CLF corresponds to a contactless communication device capable of performing contactless communication with an external device. In a case where the CLF includes an antenna for contactless communication, for example, the CLF receives a carrier wave via the antenna to demodulate a signal and performs load modulation to thereby make a response to the external device via the antenna. Further, in a case where contactless communication is performed via an external antenna to which the CLF is connected, for example, the CLF receives a carrier wave via the external antenna to demodulate a signal and performs load modulation to make a response to the external device via the external antenna.

The DH includes, for example, a processor made up of an MPU, various processing circuits, and the like. The processor included in the DH executes a middleware or an application to perform various kinds of processing. Herein, the processor included in the DH corresponds to an "external processor" seen from the UICC.

The information processing apparatus 100 has, for example, the hardware configuration shown in FIG. 1.

Note that a hardware configuration of the information processing apparatus according to the embodiment is not limited to the configuration shown in FIG. 1.

For example, the UICC and the CLF shown in FIG. 1 may configured by one piece of hardware.

Further, for example, in a case where the UICC is connected to an external contactless device having a function similar to the CLF, the information processing apparatus according to the embodiment does not need to include the CLF shown in FIG. 1.

Further, for example, in a case where the UICC is connected to an external processing apparatus having a function similar to the DH, the information processing apparatus according to the embodiment does not need to include the DH shown in FIG. 1. In other words, the "external processor" seen from the UICC according to the embodiment may be, for example, a processor included in the external device of the information processing apparatus according to the embodiment.

Hereinafter, a case where the information processing apparatus according to the embodiment is the information processing apparatus 100 having the hardware configuration shown in FIG. 1 will be described as an example.

Figure 2:
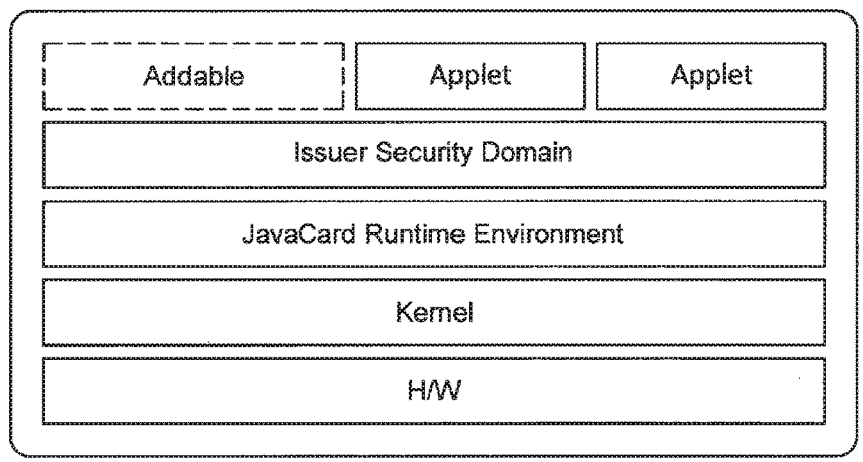
FIG. 2 is an explanatory diagram showing an example of a software configuration of the information processing apparatus according to the embodiment.

[1-2] Software Configuration Example of Information Processing Apparatus According to Embodiment FIG. 2 is an explanatory diagram showing an example of a software configuration of the information processing apparatus 100 according to the embodiment.

As shown in FIG. 2, software constituting the information processing apparatus 100 is, for example, a kernel (Kernel in FIG. 2), a "Java Card Runtime Environment", an "Issuer Security Domain" (hereinafter, referred to as "ISD" in some cases), and various applications (applets shown in FIG. 2). Further, an application constituting the software constituting the information processing apparatus 100 may also be addable as indicated by "Addable" in FIG. 2. Further, an application constituting the software constituting the information processing apparatus 100 may also be deletable.

The software of the information processing apparatus 100 is executed by, for example, the processor constituting the UICC. In FIG. 2, for example, the processor constituting the UICC shown in FIG. 1 is indicated by "H/W".

In the kernel, a communication protocol such as the SWP is mounted.

The "Java Card Runtime Environment" includes a JavaCard virtual machine (VM) for interpreting the Java (registered trademark) language and has a function of executing a program. A JavaCard function prescribed in the Java Card Forum is provided, and therefore a function of managing a plurality of programs as applets and appropriately switching the programs is provided.

The "Issuer Security Domain" is a concept prescribed by a Global Platform (hereinafter, referred to as "GP") which is an industry standards organization. The "Issuer Security Domain" logically exists in an application execution environment such as the "Java Card Runtime Environment" and manages various kinds of authority and a status of the UICC as a manager at the time of installation of an applet instead of an issuer. Further, the "Issuer Security Domain" has a key value, an authentication algorithm, and an input/output command in order to verify, for example, whether or not various kinds of authority are possessed. The "Issuer Security Domain", as well as another applet, is managed in the "Java Card Runtime Environment".

Note that, although not shown in FIG. 2, a "Supplementary Security Domain" (hereinafter, referred to as "SD" in some cases) assisting the "Issuer Security Domain" prescribed by the GP can exist in the information processing apparatus 100 as described below. The "Supplementary Security Domain" is realized by, for example, the Java (registered trademark) language.

In a case where the information processing apparatus 100 has, for example, the software configuration shown in FIG. 2, the processing related to the information processing method according to the embodiment is realized by, for example, the "Java Card Runtime Environment" or the "Issuer Security Domain" executed by the processor constituting the UICC.

Note that it is needless to say that the software configuration of the information processing apparatus 100 according to the embodiment is not limited to the example shown in FIG. 2.

The processing related to the information processing method according to the embodiment is realized by, for example, the hardware configuration and the software configuration shown in FIG. 1 and FIG. 2.

[2] Information Processing Method According to Embodiment

An information processing method according to the embodiment will be described.

[2-1] File System Used in Information Processing Method According to Embodiment

An example of a file system used in the information processing method according to the embodiment will be described.

Figure 3A:
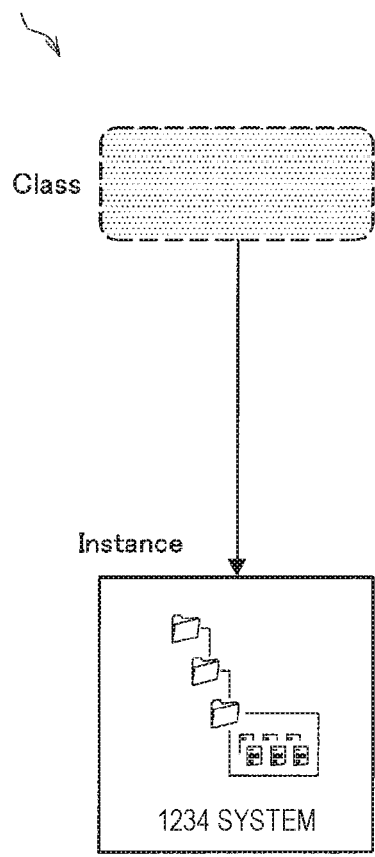
FIGS. 3A and 3B show an example of an existing file system related to provision of a service using an application.
Figure 3B:
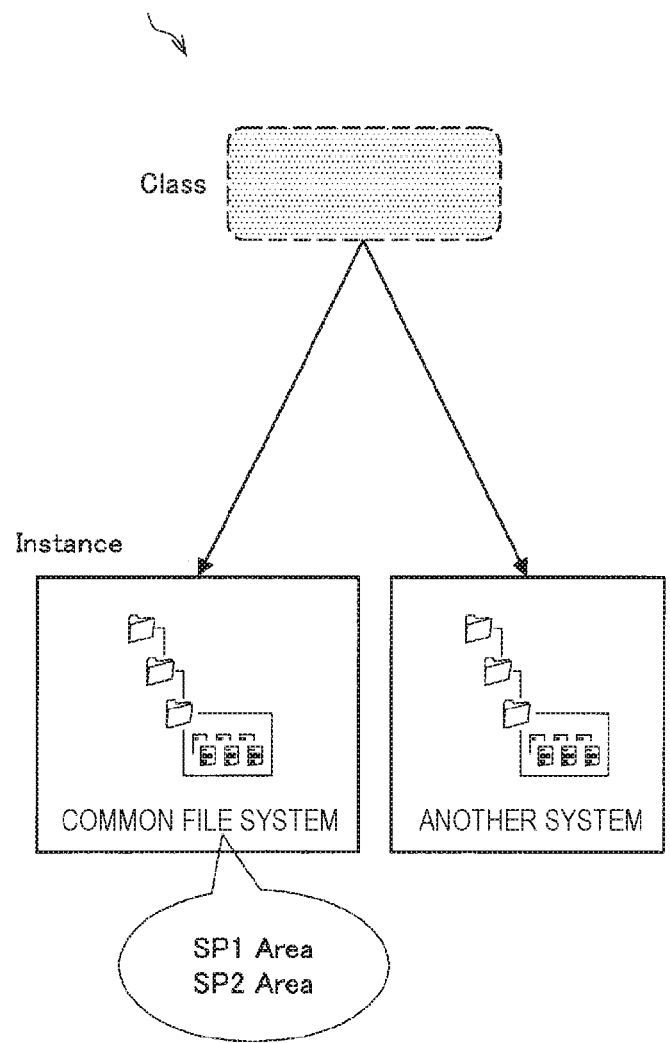

FIGS. 3A and 3B show an example of an existing file system related to provision of a service using an application.

FIG. 3A shows an example of a file system related to a service provided by one service provider (hereinafter, referred to as "SP" in some cases) and shows an example where one instance is associated with one class. Further, FIG. 3B shows an example of a file system that can correspond to services provided by a plurality of service providers and shows an example where a plurality of instances are associated with one class. Each instance has a file system.

In a case where it is only necessary to cope with a service provided by one service provider, for example, the file system indicated in FIG. 3A may be used. However, it is required to cope with services provided by a plurality of service providers in accordance with diversification of services, improvement in performance of devices, and the like.

Herein, in a case where, for example, the file system indicated in FIG. 3B is used, it is possible to cope with services provided by a plurality of service providers. However, in a case where, for example, the file system indicated in FIG. 3B is used, an area for each of the plurality of service providers needs to be provided in a common file system of an instance. Therefore, in a case where, for example, the file system indicated in FIG. 3B is used, an application corresponding to a service provided by each service provider cannot be associated with pieces of unique identification information of the respective service providers, such as AIDs. Herein, the area according to the embodiment indicates, for example, a memory space using a memory address or the like or a logical field which can be accessed only by an exclusive or specified service provider on the basis of information (data) indicating a start point to an end point and information (data) indicating propriety of access such as authority.

In view of this, in the information processing method according to the embodiment, it is possible to associate unique identification information such as AIDs with each application, and it is also possible to access the common file system from a plurality of applications.

Figure 4:
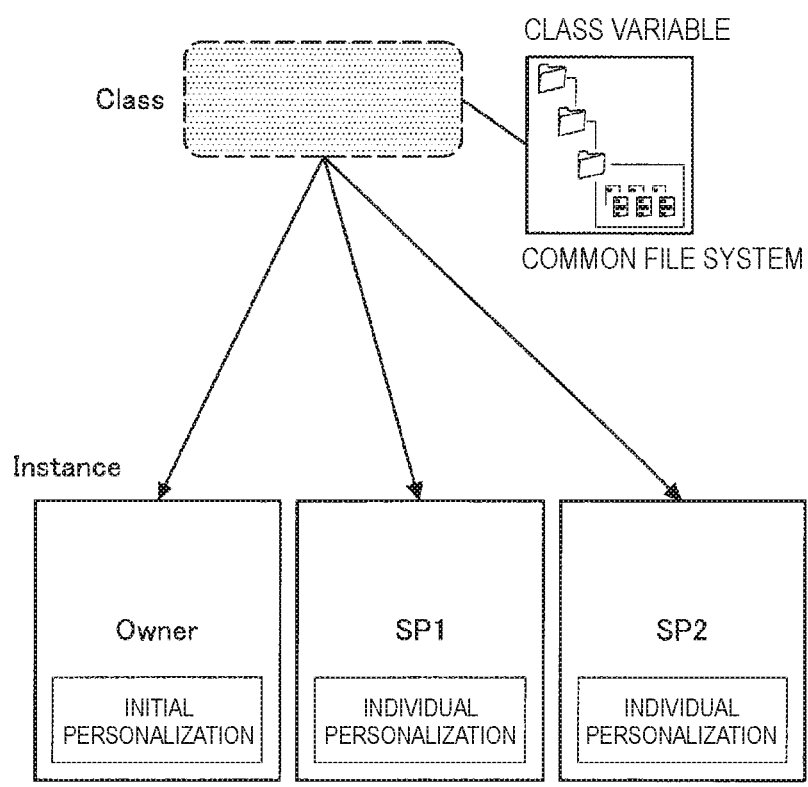
FIG. 4 is an explanatory diagram for describing an information processing method according to the embodiment.

FIG. 4 is an explanatory diagram for describing the information processing method according to the embodiment and shows an example of the file system according to the embodiment.

An "Owner" shown in FIG. 4 indicates, for example, a business operator who provides a structure related to the information processing method according to the embodiment, and an instance of the "Owner" is generated first.

Further, personalization shown in FIG. 4 is, for example, performing setting of an area, setting of a service, setting of initial data, and setting of key information. The personalization according to the embodiment indicates, for example, a method called personalization support prescribed by the GP. A secure communication channel with an external device can be constructed by personalization with the use of a key that the SD possesses, and encryption and a message signature can be applied depending on a condition. By using this structure, an application belonging to the SD can borrow a key from the SD and realize secure data communication.

By the personalization, information such as an area and a service is registered as, for example, node information. In FIG. 4, registration of an upper management node is indicated by "Initial", and registration of a node unique to a service is indicated by "Individual".

Herein, the node information according to the embodiment is, for example, numerical value information (data) used for indicating an access method and an access authority to a logical memory space and a hierarchical relationship. The node information is configured to have key information as necessary. An implementation example of the node information can be also known from "FeliCa Card User's Manual Excerpted Edition" (http://www.sony.co.jp/Products/felica/business/techsupport/data/card_usersmanual_2.0.pdf).

As shown in FIG. 4, in the information processing method according to the embodiment, the common file system is set as a class variable, and an individual instance is associated with, for example, an individual service provider.

For example, as shown in FIG. 4, the common file system is set as a class variable and an individual instance is associated with an individual service provider or the like, and therefore it is possible to associate unique identification information such as an AID with an application corresponding to a service provided by each service provider. Further, it is possible to access the common file system from a plurality of applications.

Figure 5:
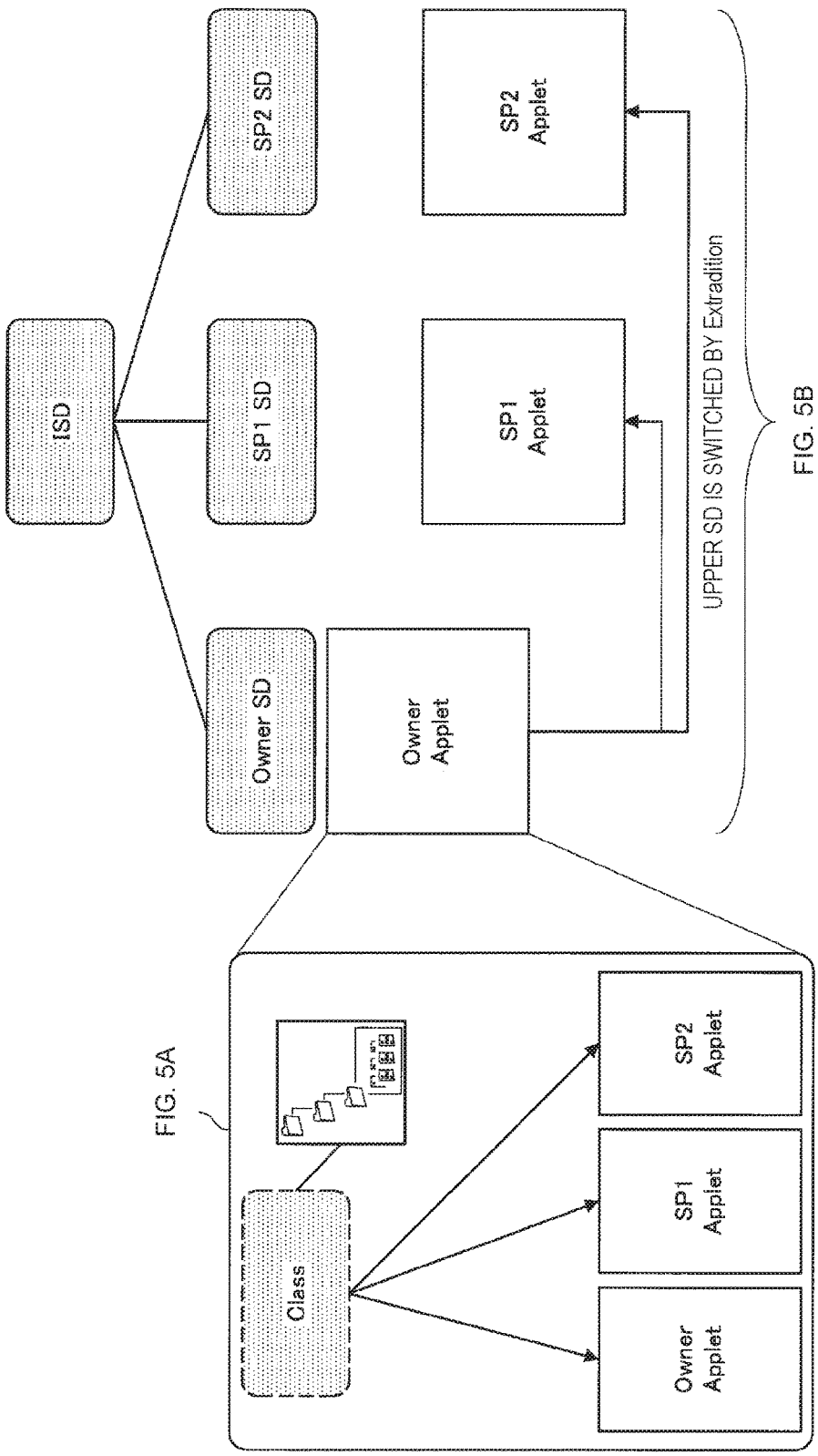
FIGS. 5A and 5B are explanatory diagrams for describing an information processing method according to the embodiment.

FIGS. 5A and 5B are explanatory diagrams for describing the information processing method according to the embodiment and shows an example of management of each instance in the information processing apparatus 100. FIGS. 5A and 5B show the ISD, an "Owner SD" which is an SD corresponding to the Owner, an "SP1 SD" which is an SD corresponding to one service provider, and an "SP2 SD" which is an SD corresponding to another service provider.

As indicated in FIG. 5A, in the information processing apparatus 100, an "Owner Applet" which is an application corresponding to the Owner, an "SP1 Applet" which is an application corresponding to one service provider, and an "SP2 Applet" which is an application corresponding to another service provider are installed under management of the "Owner SD". A state indicated in FIG. 5A is a state in which the "Owner Applet", the "SP1 Applet", and the "SP2 Applet" are associated with the "Owner SD".

Further, for example, as indicated in FIG. 5B, in the information processing apparatus 100, an SD associated with the "SP1 Applet" may be changed to the "SP1 SD", and an SD associated with the "SP2 Applet" may be changed to the "SP2 SD". Association of an applet with an SD is changed by, for example, a method called content extradition (hereinafter, referred to as "Extradition" in some cases) prescribed by the GP.

[2-2] Processing in Information Processing Method According to Embodiment

The processing related to the information processing method according to the embodiment will be described.

The information processing apparatus 100 (more specifically, for example, UICC in FIG. 1) controls access from an application to the common file system (access control processing).

As described above, the information processing apparatus 100 changes how to perform access control between, for example, a case of performing contact communication with the processor (external processor) constituting the DH and a case of performing contactless communication via the CLF (contactless communication device). Hereinafter, access control processing according to the embodiment will be described more specifically.

[2-2-1] First Example of Access Control Processing: Access Control Performed in a Case where Contact Communication is Performed In a case where contact communication is performed with respect to the external processor, the information processing apparatus 100 controls access by using first identification information associated with each of a plurality of applications.

Herein, the first identification information according to the embodiment is identification information for specifying an application. As described above with reference to FIGS. 4 and 5A and 5B, in the information processing method according to the embodiment, it is possible to associate an unique ID such as an AID with each application installed in the UICC. Thus, the first identification information according to the embodiment is, for example, an AID.

The AID according to the embodiment is calculated as described below by using, for example, a registered application provider identifier (RID) which is an ID unique to a service provider, ID accompanying information called proprietary application identifier extension (PIX), and a value indicating a version of an applet. Herein, the PIX is, for example, a value obtained by combining an identifier of the service provider and a system code (second identification information described below). Uniqueness of the AID can be ensured by calculating the AID as described below.

AID=RID+PIX+Applet version

Note that the AID according to the embodiment is not limited to the above example. For example, the AID according to the embodiment may be an AID prescribed by ISO7816-5. Further, the AID according to the embodiment may be a unique ID that can be uniquely calculated by some method.

Figure 6:
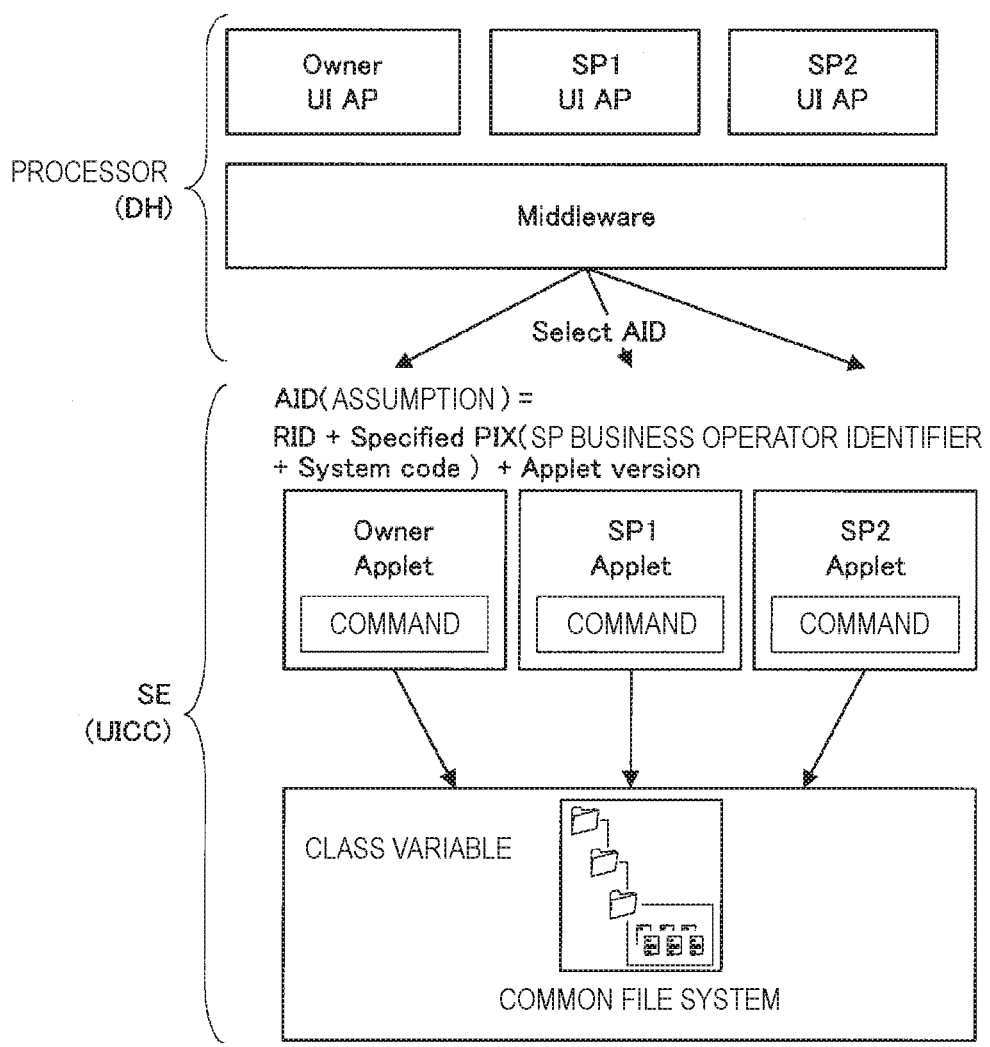
FIG. 6 is an explanatory diagram for describing an information processing method according to the embodiment.

FIG. 6 is an explanatory diagram for describing the information processing method according to the embodiment and shows an example of access control performed in a case where contact communication is performed between the UICC and the DH. The term "SE" shown in FIG. 6 indicates a secure element of the UICC.

In a case where contact communication is performed between the UICC and the DH, for example, the middleware executed by the processor of the DH selects an application in accordance with an application executed by the processor with the use of an AID (example of identification information).

The UICC acquires the AID selected by the middleware via contact communication with the DH. Herein, the AID that the UICC acquires from the DH via contact communication corresponds to identification information acquired from the external processor.

The UICC that has acquired the AID selected by the middleware selects an application associated with an AID (example of first identification information) corresponding to the acquired AID.

The UICC selects, for example, an application associated with an AID matched with the AID selected by the middleware. Note that, in a case where the identification information selected by the middleware is not an AID, the UICC can also select an application by specifying an AID corresponding to the identification information with the use of, for example, a table in which an AID is associated with another ID.

As a specific example, for example, in a case where a transmitted AID is shorter than registered AIDs, an applet having a corresponding part matched with the transmitted AID is selected from the registered AIDs. In a case where a plurality of applets are matched, for example, an applet registered earlier is selected. Further, in a case where transmitted information is manufacturer identification information called IDm and the manufacturer identification information is registered while being associated with an AID, it is possible to derive and select the AID.

When the application is selected, the UICC causes the selected application to access the common file system.

Herein, in a case where the selected application is caused to access the common file system, the UICC may perform authentication using key information. In a case where authentication using key information is performed, for example, only an application of a service provider who knows a key can access the common file system. Note that individual files of the common file system may include a file that needs to perform authentication and a file that does not need to perform authentication.

Further, when the application is caused to access the common file system by the access control processing according to the embodiment, processing (execution processing) using the common file system is performed.

Herein, for example, the execution processing according to the embodiment may be performed as a part of the processing related to the information processing method according to the embodiment or may be performed as processing different from the processing related to the information processing method according to the embodiment. Further, the execution processing according to the embodiment is performed by, for example, the processor constituting the UICC. Note that the execution processing according to the embodiment can also be performed by, for example, the processor (external processor) constituting the DH or a processor included in an external device of the information processing apparatus 100.

The execution processing according to the embodiment is performed by executing, for example, a command set in each applet shown in FIG. 6. Note that the command according to the embodiment may be set in a class that possesses the common file system. A static method indicates processing that is accessible without instantiating a class prescribed in Java (registered trademark). Note that, hereinabove, a case of a specified execution environment has been described as an example, and the information processing method according to the embodiment is not limited to the above example.

Figure 7B:
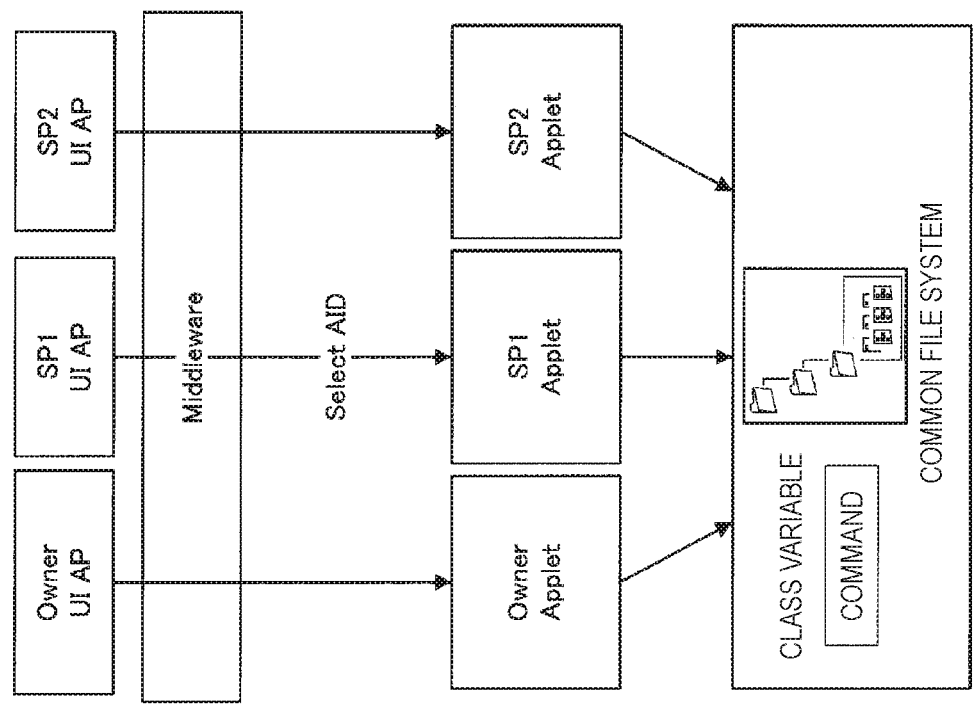
FIGS. 7A and 7B are explanatory diagrams for describing an example of an effect of access control processing related to the information processing method according to the embodiment.
Figure 7A:
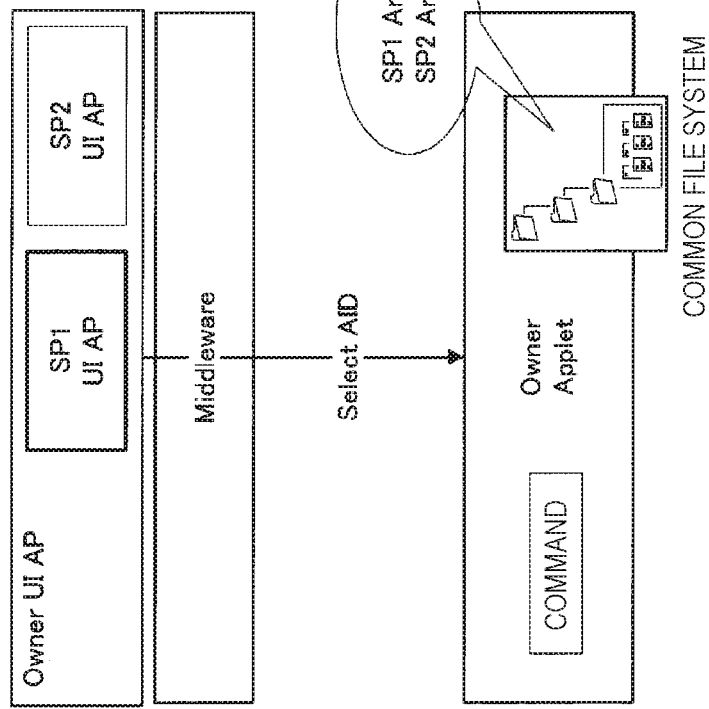

FIGS. 7A and 7B are explanatory diagrams for describing an example of an effect of the access control processing related to the information processing method according to the embodiment. FIG. 7A shows an example of operation of an existing information processing apparatus performed in a case where an application "SP1 UI AP" of a user interface (UI) corresponding to one service provider is executed in the DH. Further, FIG. 7B shows an example of operation of the information processing apparatus 100 according to the embodiment performed in a case where the "SP1 UI AP" is executed.

As described with reference to, for example, in FIG. 3B, the existing information processing apparatus cannot associate AIDs corresponding to the number of service providers with each application. Therefore, in order to perform processing using the "SP1 Applet" corresponding to one service provider, a user who uses the existing information processing apparatus needs to execute an "Owner UI AP" with which an AID is associated and then execute the "SP1 UI AP" again, i.e., perform two stages of operation.

On the contrary, the information processing apparatus 100 can associate AIDs with each application. Thus, in order to perform processing using the "SP1 Applet" corresponding to one service provider, a user who uses the information processing apparatus 100 only needs to execute the "SP1 UI AP".

Thus, the information processing apparatus 100 that performs the access control processing according to the first example can simplify user operation, as compared with a case where the existing information processing apparatus is used. Therefore, it is possible to improve operability of the user.

Further, the information processing apparatus 100 that performs the access control processing according to the first example can associate AIDs with each application, and therefore it is also possible to employ an existing control method using AIDs. As a result, access control that the information processing apparatus 100 has can be controlled in accordance with individual AIDs, and therefore it is possible to ensure security in finer units. In the above example, the access control performed by the information processing apparatus is such that, in a case of only the "Owner UI AP" with which the AID is associated, a plurality of UI APs for SPs other than the "SP1 UI AP" do not become targets to be controlled even when the plurality of UI APs for SP are included therein. Therefore, it is difficult to individually set optimal security.

[2-2-2] Second Example of Access Control Processing: Access Control Performed in a Case where Contactless Communication is Performed In a case where contactless communication is performed via a contactless communication device such as the CLF, the information processing apparatus 100 controls access by using second identification information for specifying an application related to contactless communication.

Herein, the second identification information according to the embodiment is, for example, a system code (hereinafter, referred to as "SC" in some cases) defined in "Global Platform Card—Card Specification v2.2—Amendment C". In other words, the second identification information according to the embodiment is identification information different from the first identification information according to the embodiment. The second identification information according to the embodiment is associated with, for example, at least one application among a plurality of applications.

FIG. 8 is an explanatory diagram for describing an example of the information processing method according to the embodiment and shows a table in which parameters called SC and IDm and a parameter called PMm are associated.

FIG. 8 shows an example where only an SC indicating "1234" is set and other SCs are not set. Note that, although AIDs are not written in the example of the above table, it is needless to say that "1234" is also associated with a specified AID and another SC is set and the other SC may be associated with an application having another AID. Further, as described above, searching an AID with the use of the IDm to call an application also falls under the information processing method according to the embodiment.

Herein, association of one piece of information with another piece of information according to the embodiment is performed by, for example, the table shown in FIG. 8. Note that association of one piece of information with another piece of information according to the embodiment is not limited to a case of performing association with the use of a table, and one piece of information and another piece of information may be associated with each other by an arbitrary method capable of performing association.

Figure 9:
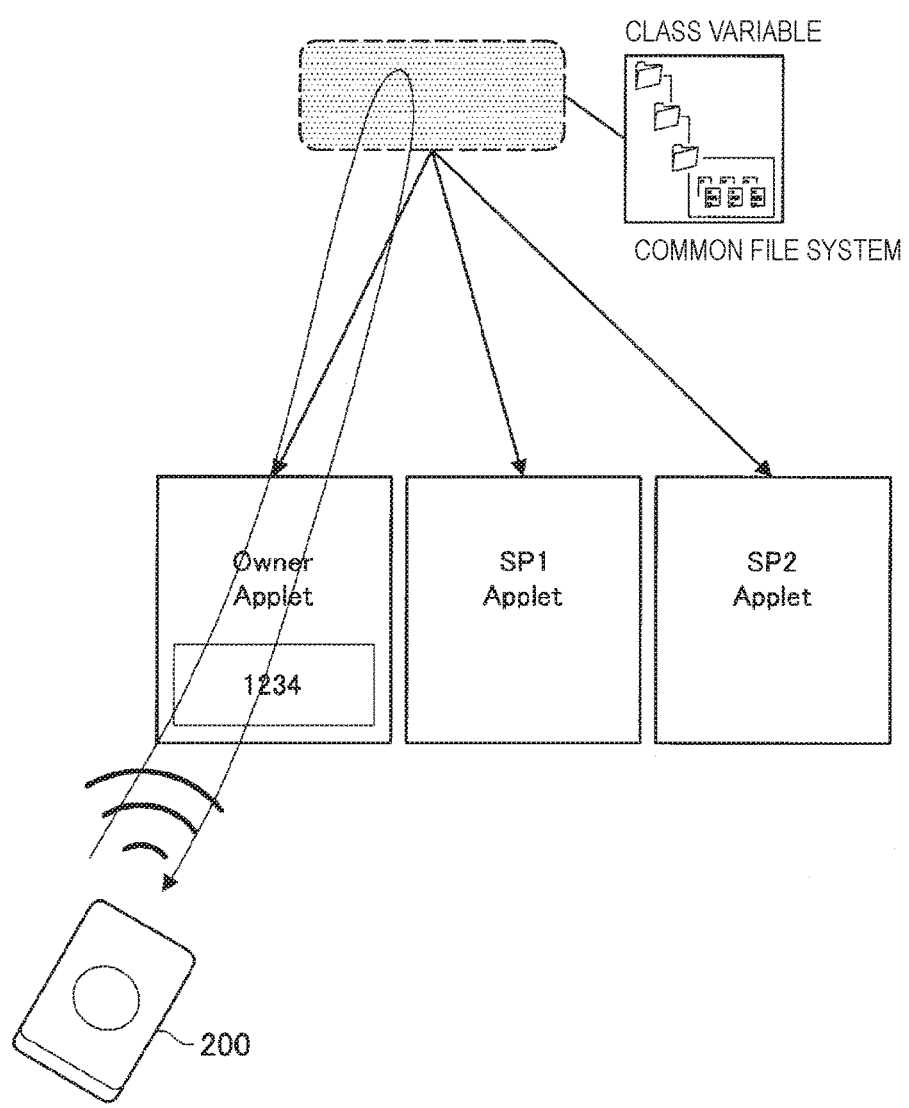
FIG. 9 is an explanatory diagram for describing an example of the information processing method according to the embodiment.

FIG. 9 is an explanatory diagram for describing an example of the information processing method according to the embodiment and shows an example of access control performed in a case where contactless communication is performed with respect to the reader/writer 200 via the CLF.

The reader/writer 200 transmits a signal including a system code via a carrier wave in a case where, for example, polling is performed. The CLF communicates the signal transmitted from the reader/writer 200 to the UICC via, for example, contact communication using the SWP.

The UICC selects an application associated with a system code (example of second identification information) corresponding to the system code (example of identification information) included in the signal that has been transmitted from the reader/writer 200 and has been acquired via the CLF.

The UICC selects, for example, an application associated with a system code matched with the system code included in the signal transmitted from the reader/writer 200. Note that, in a case where identification information contained in the signal transmitted from the reader/writer 200 is not a system code, the UICC can also select an application by specifying a system code corresponding to the identification information with the use of, for example, a table in which a system code and another ID are associated.

When an application is selected, the UICC causes the selected application to access the common file system.

Herein, in a case where the system code is associated only with the "Owner Applet" as shown in FIG. 9, the UICC selects the "Owner Applet" and causes the "Owner Applet" to access the common file system.

Further, when the execution processing according to the embodiment is performed, transaction processing related to contactless communication is performed in the UICC. In other words, in the example shown in FIG. 9, transaction processing related to the "SP1 Applet" and the "SP2 Applet" which are not associated with a system code is performed by the "Owner Applet".

Thus, the information processing apparatus 100 that performs the access control processing according to the second example can perform contactless communication with the reader/writer 200 related to existing contactless communication via the CLF and is compatible with existing contactless communication.

Note that, as described above, a system coat other than "1234" may be associated with an application other than the "Owner Applet". In a case where system codes are associated with a plurality of applications, the UICC selects, from the plurality of applications, an application associated with a system code corresponding to a system code acquired from the CLF.

In a case where system codes are associated with a plurality of applications as described above, it is possible to access the common file system with the use of the plurality of system codes.

In a case where contact communication is performed with respect to the processor (external processor) constituting the DH, the information processing apparatus 100 performs, for example, the access control processing according to the first example described in the above section [2-2-1] or performs, for example, the access control processing according to the second example described in the above section [2-2-2].

Thus, the information processing apparatus 100 can control access from an application to the common file system in accordance with a communication channel.

Further, as described above, for example, when how to perform access control is changed between a case where contact communication is performed with respect to the processor (external processor) constituting the DH and a case where contactless communication is performed via the CLF (contactless communication device), it is possible to have an effect exhibited in a case where contact communication with the external processor is performed while maintaining compatibility with existing contactless communication.

[3] Specific Example of Processing Related to Information Processing Method According to Embodiment A specific example of the processing related to the information processing method according to the embodiment will be described.

Figure 10:
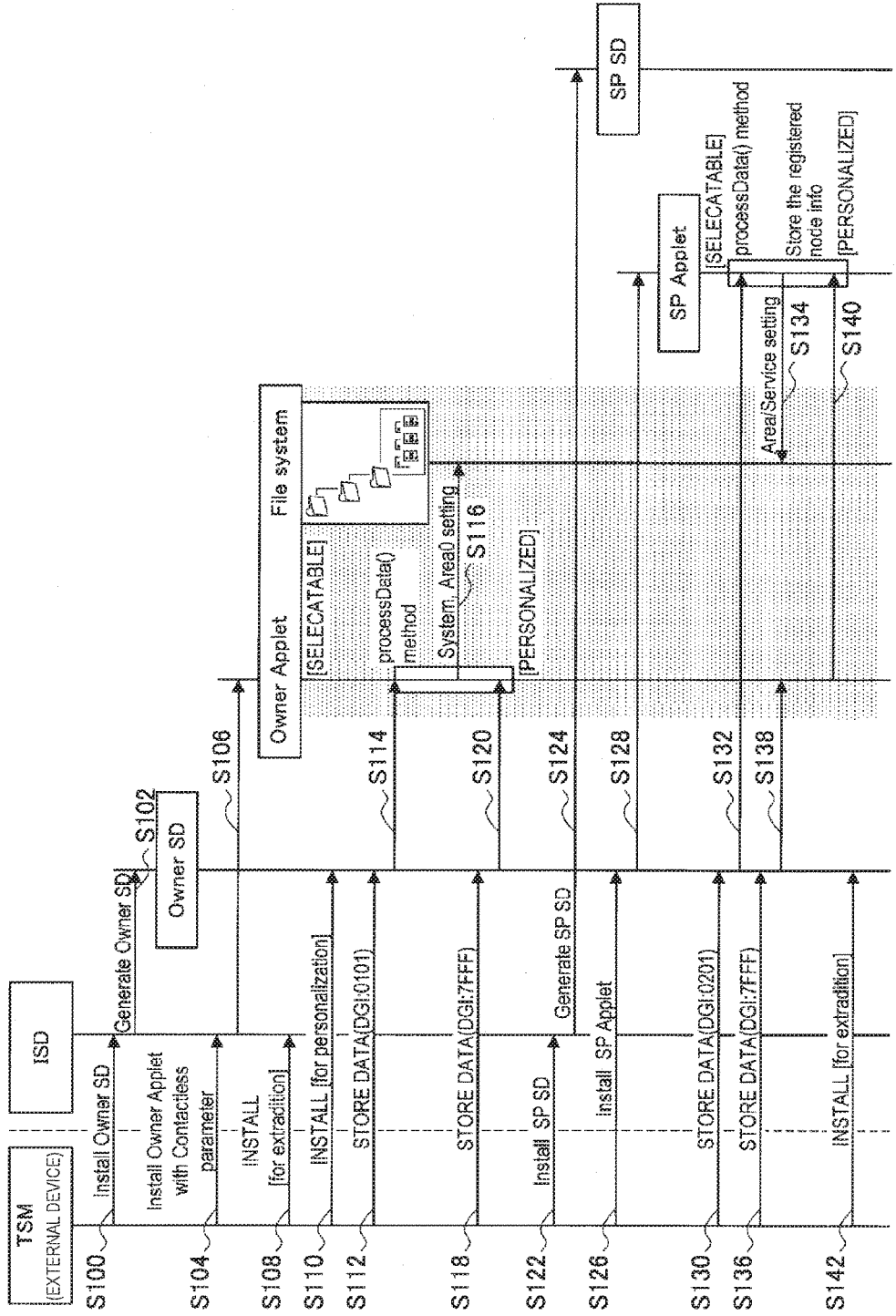
FIG. 10 is a flowchart showing a first example of processing related to the information processing method according to the embodiment.

[3-1] First Example of Processing Related to Information Processing Method According to Embodiment: Processing Related to Issue of Applet FIG. 10 is a flowchart showing a first example of the processing related to the information processing method according to the embodiment. FIG. 10 shows an example of processing performed in a case where an applet is issued by an external device such as a trusted service manager (TSM). The TSM and the information processing apparatus 100 perform communication with the use of, for example, a public wireless network. Note that processing related to replacement or authentication of key information is omitted in FIG. 10.

The TSM transmits an installation request of an "Owner SD" to the information processing apparatus 100 (S102), and the ISD of the information processing apparatus 100 generates the "Owner SD" in response to the installation request (S102).

The ISD of the information processing apparatus 100 installs an "Owner Applet" in response to an installation request of the "Owner Applet" received from the TSM (S104, S106).

The ISD of the information processing apparatus 100 performs processing based on the installation request received from the TSM (S108), and the "Owner SD" of the information processing apparatus 100 performs processing related to personalization of the "Owner Applet" on the basis of the installation request received from the TSM or various kinds of data (S110 to S120). Herein, for example, setting of an area, setting of a service, setting of initial data, and setting of key information are performed in processing in Step S116 in the processing related to personalization as described above. Note that, as described above, the above data can be safely delivered by applying encryption or a message signature with the use of key information that the "Owner SD" has.

Figure 11A:
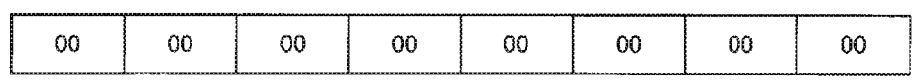
FIGS. 11A, 11B and 11C are explanatory diagrams for describing an example of processing related to the information processing method according to the embodiment.
Figure 11B:
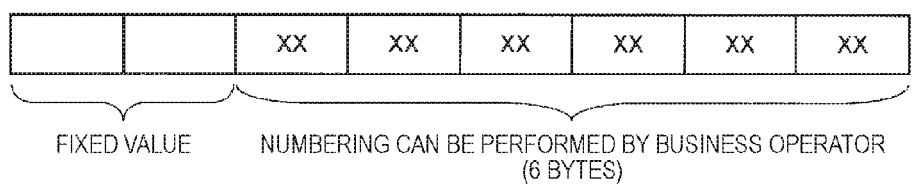
Figure 11C:
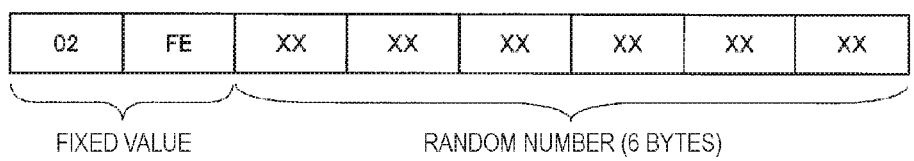

FIGS. 11A, 11B and 11C are explanatory diagrams for describing an example of the processing related to the information processing method according to the embodiment and shows an example of processing related to setting of the IDm.

In a case where personalization is performed, for example, binary in which all values are set to 0 as initial values of an IDm of an applet as indicated in FIG. 11A is set.

Further, in a case where personalization is performed, for example, a service provider (or, for example, a business operator who is commissioned by the service provider) can also rewrite a value of the IDm to an arbitrary value as indicated in FIG. 11B. Herein, a fixed value in FIG. 11B is, for example, a manufacturer code. Note that, in order to ensure uniqueness of the Dm, a fixed value of each service provider may be managed by, for example, a manager who operates the TSM.

Note that it is also considered that the value of the IDm is not rewritten even in a case where the value of the IDm is rewritable by a service provider. In view of this, in a case where, for example, the initial values of the IDm are maintained as they are in the last step of the personalization, the information processing apparatus 100 may compulsively rewrite the values of the IDm as shown in FIG. 11C. The information processing apparatus 100 compulsively rewrites the values of the IDm on the basis of, for example, a combination of a predetermined fixed value and a random number.

For example, as shown in FIG. 11C, automatic numbering of the IDm is realized by compulsively rewriting the values of the IDm from the initial values, and therefore it is possible to improve a possibility of ensuring uniqueness of the IDm.

Referring to FIG. 10 again, the first example of the processing related to the information processing method according to the embodiment will be described. The ISD of the information processing apparatus 100 generates an "SP SD" in response to an installation request of the "SP SD" received from the TSM (S122, S124).

The "Owner SD" of the information processing apparatus 100 installs an "SP Applet" in response to an installation request of the "SP Applet" received from the TSM (S126, S128).

The "Owner SD" of the information processing apparatus 100 performs processing related to personalization of the "SP Applet" on the basis of various kinds of data received from the TSM (S130 to S140). The "SP Applet" accepts processing from an entry point called processData in response to a personalization processing request and holds node information that the "SP Applet" should register. Further, the "SP Applet" implements registration processing of a file with respect to the common file system on the basis of the node information. Further, the "Owner SD" of the information processing apparatus 100 performs processing based on a content extradition request received from the TSM and transfers authority of the "SP Applet" belonging to the SD to the "SP SD" (S142).

In the information processing apparatus 100, each applet is issued (installed) by performing, for example, the processing shown in FIG. 10.

Note that the processing according to the first example is not limited to the processing shown in FIG. 10. For example, FIG. 10 shows an example where the "Owner SD" is granted an installation right. However, authority granted to the SD such as the "Owner SD" depends on operation of the information processing apparatus 100, and the installation right does not need to be granted to the "Owner SD". For example, in a case where the installation right is not granted to the "Owner SD", for example, the content extradition indicated in FIG. 5B is performed at the time of installation.

Figure 12:
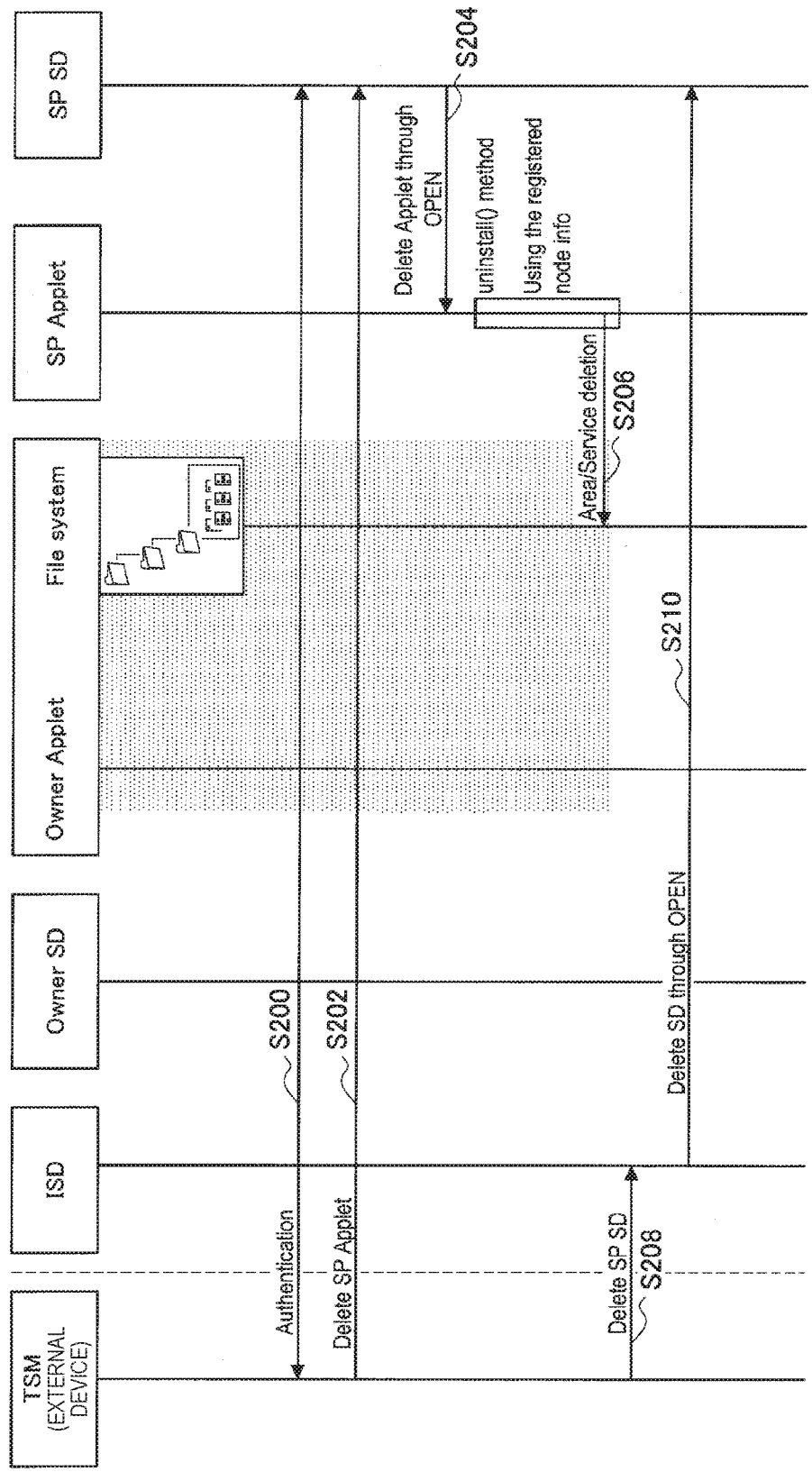
FIG. 12 is a flowchart showing a second example of the processing related to the information processing method according to the embodiment.

[3-2] Second Example of Processing Related to Information Processing Method According to Embodiment: Processing Related to Deletion of Applet and SD FIG. 12 is a flowchart showing a second example of the processing related to the information processing method according to the embodiment. FIG. 12 shows an example of processing performed in a case where deletion of an "SP Applet" and deletion of an "SP SD" are performed by an external device such as the TSM.

The TSM and the "SP SD" of the information processing apparatus 100 perform mutual authentication (S200).

When mutual authentication is completed, the TSM transmits a deletion request of the "SP Applet" (S202), and the "SP SD" of the information processing apparatus 100 performs processing related to deletion of the "SP Applet" in response to the deletion request (S204 to S206). For example, encryption or a message signature is applied to the deletion request depending on a condition of the mutual authentication, and only an SP that knows a key of the "SP SD" can transmit the deletion request. By using the above structure, each SP cannot transmit a deletion request of an "SP Applet" held for each "SP SD" without permission.

In order to comply with the deletion request, the "SP Applet" executes processing that should be performed at the time of deletion from an entry point called uninstallation method that the "SP Applet" has. At that time, the "SP Applet" deletes a part that the "SP Applet" has registered from a file system with the use of node information that the "SP Applet" has registered. Note that, although, when the registered node information is used, a part that another applet has registered is not deleted, it is needless to say that, in a case where the node information is a file of a superordinate concept, a file of a subordinate concept is automatically deleted. As the node information to be registered, each individual piece of the node information or only the most superordinate concept can be registered.

The ISD of the information processing apparatus 100 deletes the "SP SD" in response to a deletion request of the "SP SD" received from the TSM (S208, S210).

In the information processing apparatus 100, the "SP Applet" is deleted and the "SP SD" is deleted by performing, for example, the processing shown in FIG. 12.

Note that the processing according to the second example is not limited to the processing shown in FIG. 12.

For example, in a case where the "SP SD" is not deleted after the "SP Applet" is deleted, the processing in Steps S208 and S210 does not need to be performed.

Further, for example, FIG. 12 shows an example where the "SP SD" is granted a deletion right. However, authority granted to the SD such as the "SP SD" depends on operation of the information processing apparatus 100, and the deletion right does not need to be granted to the "SP SD". For example, in a case where the deletion right is not granted to the "SP SD", for example, the "SP SD" is deleted by the ISD.

Figure 13:
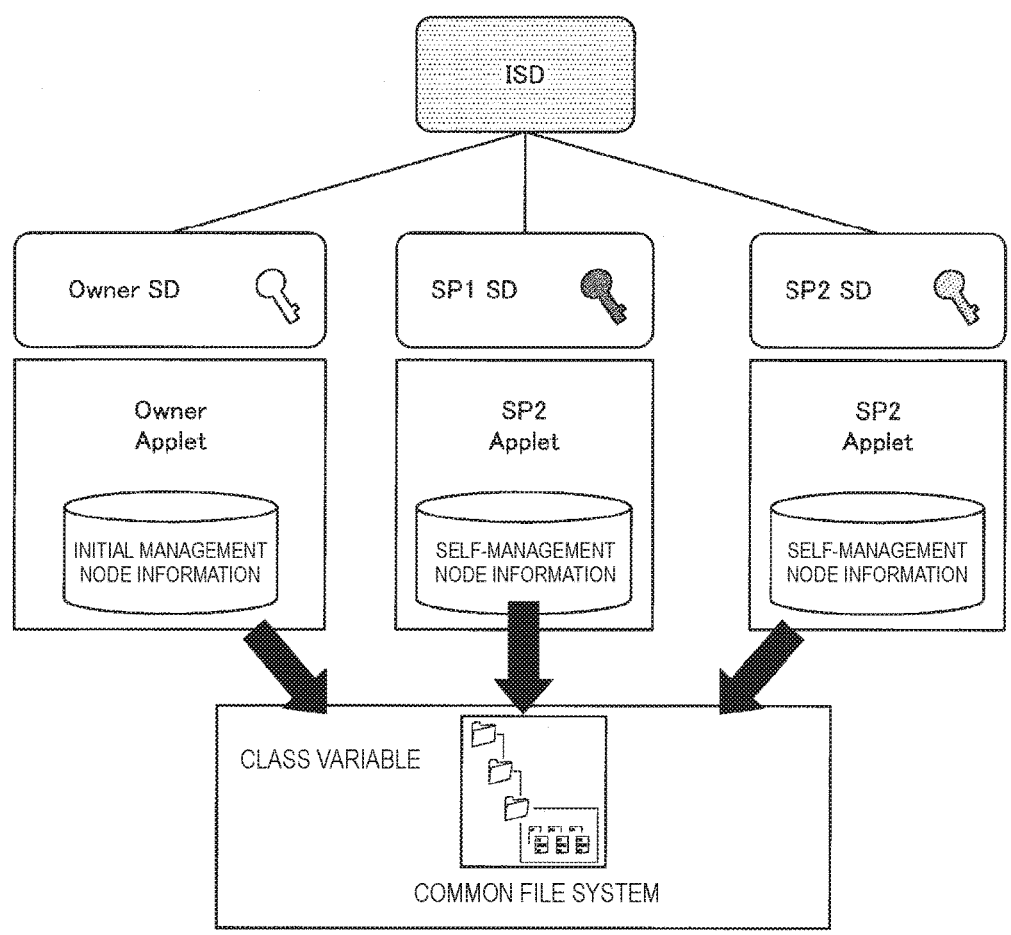
FIG. 13 is an explanatory diagram for describing a third example of the processing related to the information processing method according to the embodiment.

[3-3] Third Example of Processing Related to Information Processing Method According to Embodiment: Processing Related to Backup of Information on Applet FIG. 13 is an explanatory diagram showing a third example of the processing related to the information processing method according to the embodiment and shows an outline of processing related to backup of information on an applet.

It is considered that, after an applet is installed by, for example, the processing shown in FIG. 10, backup of information on the applet is desired in order to, for example, update the applet.

In the processing according to the third example, each applet possesses node information (for example, information indicating an area indicating a start point to an end point or a service) through the processing related to personalization and therefore reads data from the common file system with the use of the node information. The read data is encrypted by using, for example, key information indicating a private key that an upper SD of the applet has, and the encrypted data is output from, for example, the UICC to the DH. Note that the above encrypted data may be transmitted to an external device such as a server of a service provider corresponding to the applet via, for example, a public wireless network. Further, the encrypted data may be shared with another applet in the information processing apparatus 100. In a case where the encrypted data is shared, it is considered that an applet to share the data temporarily holds the data and maintains the data even after the original applet is deleted and therefore an updated applet is installed again and the data is appropriately returned thereto. In addition to a backup method using a server and an applet, a similar structure can also be constructed by providing an application that can temporarily hold encrypted data in the DH.

By performing the above processing, for example, it is possible to perform backup in a state in which only information on each applet is encrypted, and therefore security of each service provider is ensured.

(Information Processing Apparatus According to Embodiment)

There will be described an example of a configuration of the information processing apparatus according to the embodiment capable of performing the above processing related to the information processing method according to the embodiment.

Figure 14:
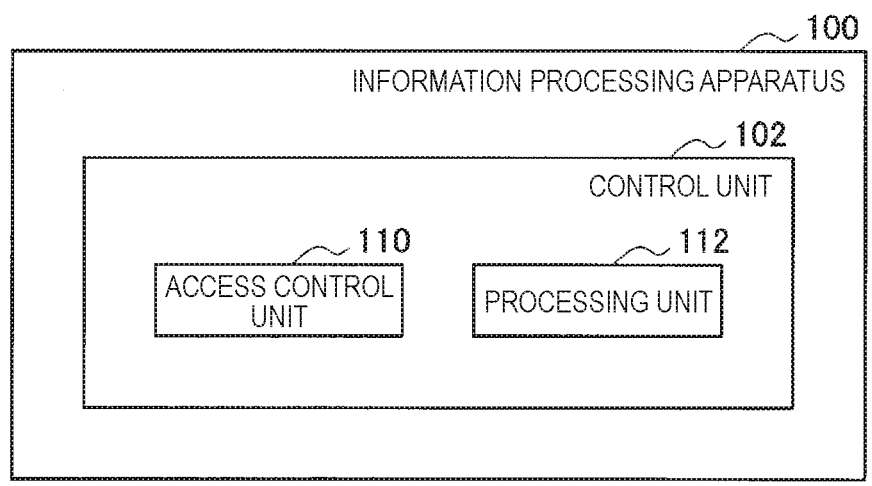
FIG. 14 is a block diagram showing an example of a configuration of the information processing apparatus according to the embodiment.

FIG. 14 is a block diagram showing an example of a configuration of the information processing apparatus 100 according to the embodiment. The information processing apparatus 100 includes, for example, a control unit 102.

Further, the information processing apparatus 100 may include, for example, a read only memory (ROM, not shown), a random access memory (RAM, not shown), and a storage unit (not shown). The information processing apparatus 100 connects the components via, for example, a bus serving as a transmission path of data. Further, as indicated by, for example, "C6" and "C7" in the UICC in FIG. 1, the information processing apparatus 100 may include a terminal used for electrically connecting the information processing apparatus 100 to an external component. The information processing apparatus 100 performs, for example, contact communication with the external component via wired communication through the terminal used for electrically connecting the information processing apparatus 100 to the external component. Further, for example, the information processing apparatus 100 is driven by obtaining power from a battery included therein, such as a secondary cell, or an external power supply.

Herein, the ROM (not shown) stores control data such as a program and an operation parameter used by the control unit 102. The RAM (not shown) temporarily stores a program or the like executed by the control unit 102.

The storage unit (not shown) stores, for example, various kinds of data including data related to the information processing method according to the embodiment such as the table shown in FIG. 8, applications, and the like. Herein, the storage unit (not shown) is, for example, a recording medium such as a non-volatile memory. Further, the storage unit (not shown) may be, for example, a recording medium having tamper resistance or may be detachable from the information processing apparatus 100.

Further, the information processing apparatus 100 has, for example, the hardware configuration shown in FIG. 1 (also including modification examples) and the software configuration shown in FIG. 2. Note that it is needless to say that the hardware configuration example and the software configuration example of the information processing apparatus 100 are not limited to the above examples.

The control unit 102 includes, for example, one or two or more processors or various processing circuits made up of an operation circuit such as an MPU and controls the whole information processing apparatus 100. Further, the control unit 102 includes, for example, an access control unit 110 and a processing unit 112 and mainly performs the processing related to the information processing method according to the embodiment.

The access control unit 110 mainly performs the access control processing according to the embodiment and controls access from an application to the common file system. The access control unit 110 performs, for example, the access control processing according to the first example described in the above section [2-2-1] and the access control processing according to the second example described in the above section [2-2-2].

The processing unit 112 mainly performs the execution processing according to the embodiment and performs processing with the use of the common file system. The processing unit 112 performs, for example, various kinds of processing such as processing related to execution of a command corresponding to an application and transaction processing related to contactless communication.

The control unit 102 includes, for example, the access control unit 110 and the processing unit 112 and therefore mainly performs the processing related to the information processing method according to the embodiment.

With, for example, the configuration shown in FIG. 14, the information processing apparatus 100 performs the processing related to the information processing method according to the embodiment (for example, the above access control processing and the above execution processing).

Therefore, with, for example, the configuration shown in FIG. 14, the information processing apparatus 100 can control access from an application to the common file system in accordance with a communication channel.

Further, with, for example, the configuration shown in FIG. 14, the information processing apparatus 100 can have, for example, an effect exhibited by performing the processing related to the information processing method according to the embodiment described above.

Note that the configuration of the information processing apparatus according to the embodiment is not limited to the configuration shown in FIG. 14.

For example, the information processing apparatus according to the embodiment can include one or both of the access control unit 110 and the processing unit 112 shown in FIG. 14 separately from the control unit 102 (one or both thereof can be realized by, for example, another processing circuit).

Further, the above access control processing and the above execution processing are parts into which the processing related to the information processing method according to the embodiment is divided for convenience. Thus, a configuration for realizing the processing related to the information processing method according to the embodiment is not limited to the access control unit 110 and the processing unit 112 shown in FIG. 14 and can have a configuration corresponding to the way to divide the processing related to the information processing method according to the embodiment.

Further, for example, in a case where the above execution processing is performed in an external device, the information processing apparatus according to the embodiment can also have a configuration that does not include the processing unit 112. Even with the configuration that does not include the processing unit 112, the information processing apparatus according to the embodiment can control, for example, access from an application to the common file system in accordance with a communication channel through the above access control processing in the access control unit 110. Thus, even with the configuration that does not include the processing unit 112, the information processing apparatus according to the embodiment can have an effect similar to the effect that the information processing apparatus 100 shown in FIG. 14 exhibits.

Hereinabove, the information processing apparatus has been described as the embodiment. However, the embodiment is not limited to such an embodiment. The embodiment is applicable to, for example, a processing IC such as a UICC, a SIM, an eUICC, an eSE, or an SD card. Further, the embodiment is applicable to, for example, various devices such as a tablet device, communication devices such as a mobile phone and a smartphone, a video/music reproducing apparatus (or video/music recording/reproducing apparatus), a game console, and a computer such as a personal computer (PC).

(Program According to Embodiment)

A program that causes a computer to function as the information processing apparatus according to the embodiment (for example, a program capable of executing the processing related to the information processing method according to the embodiment, such as "the above access control processing" and "the above access control processing and the above execution processing") is executed by a processor or the like in a computer, and therefore it is possible to control access from an application to the common file system in accordance with a communication channel.

Moreover, when a program that causes a computer to function as the information processing apparatus according to the present embodiment is executed by a processor or the like in the computer, it is possible to provide an effect provided by the processing related to the information processing method according to the present embodiment described above.

The program according to the present embodiment may be, for example, a program operating solely, or a library used from another program such as an application.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing apparatus according to the present embodiment is provided, but the present embodiment can further provide a recording medium in which the above-described program is stored together.

The above-described configurations express examples of the present embodiment and, of course, pertain to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including an access control unit configured to control access from an application to a common file system accessible from a plurality of applications, wherein the access control unit in a case where contact communication is performed with respect to an external processor, controls access by using first identification information for specifying an application, the first identification information being associated with each of the plurality of applications, and in a case where contactless communication is performed via a contactless communication device capable of performing contactless communication with an external device, controls access by using second identification information for specifying an application related to contactless communication, the second identification information being associated with at least one application among the plurality of applications.

(2)

The information processing apparatus according to (1), wherein, in a case where the contact communication is performed, the access control unit selects an application associated with the first identification information corresponding to identification information acquired from the processor and causes the selected application to access the common file system.

(3) The information processing apparatus according to (1) or (2),
wherein, in a case where the contactless communication is performed, the access control unit selects an application associated with the second identification information corresponding to identification information acquired from the contactless communication device and causes the selected application to access the common file system.

(4) The information processing apparatus according to any one of (1) to (3), further including
a processing unit configured to perform processing by using the common file system.

(5) The information processing apparatus according to any one of (1) to (4), further including
the contactless communication device.

(6) The information processing apparatus according to any one of (1) to (5), further including
the processor.

(7) The information processing apparatus according to claim 1,
wherein the first identification information and the second identification information are different pieces of identification information.

(8) An information processing method executed by an information processing apparatus, including
a step of controlling access from an application to a common file system accessible from a plurality of applications,
wherein, in the controlling step,
in a case where contact communication is performed with respect to an external processor, access is controlled by using first identification information for specifying an application, the first identification information being associated with each of the plurality of applications, and
in a case where contactless communication is performed via a contactless communication device capable of performing contactless communication with an external device, access is controlled by using second identification information for specifying an application related to contactless communication, the second identification information being associated with at least one application among the plurality of applications.

(9) A program causing a computer to execute a step of controlling access from an application to a common file system accessible from a plurality of applications,
wherein, in the controlling step,
in a case where contact communication is performed with respect to an external processor, access is controlled by using first identification information for specifying an application, the first identification information being associated with each of the plurality of applications, and
in a case where contactless communication is performed via a contactless communication device capable of performing contactless communication with an external device, access is controlled by using second identification information for specifying an application related to contactless communication, the second identification information being associated with at least one application among the plurality of applications.

REFERENCE SIGNS LIST 100 information processing apparatus
102 control unit
110 access control unit
112 processing unit
200 reader/writer

The invention claimed is:

1. An information processing apparatus, comprising:
a first processor:
an access control unit configured to:
control access from a first application to a common file system, wherein the common file system is accessible from a plurality of applications;
control access, to specify a second application, based on first identification information and contact communication executed between the first processor and a second processor,
wherein the first identification information is associated with each of the plurality of applications; and
control access, to specify a third application related to contactless communication, based on second identification information and the contactless communication,
wherein a contactless communication device executes the contactless communication with the second processor, and
wherein the second identification information is associated with at least one application among the plurality of applications.

2. The information processing apparatus according to claim 1, wherein, based on the contact communication that is executed, the access control unit is further configured to select a fourth application associated with the first identification information corresponding to identification information acquired from an external processor and control the selected fourth application to access the common file system.

3. The information processing apparatus according to claim 1, wherein, based on the contactless communication that is executed, the access control unit is further configured to select a fourth application associated with the second identification information corresponding to identification information acquired from the contactless communication device and control the selected fourth application to access the common file system.

4. The information processing apparatus according to claim 1, further comprising a processing unit configured to execute a processing operation based on the common file system.

5. The information processing apparatus according to claim 1, further comprising the contactless communication device.

6. An information processing method, comprising:
in an information processing apparatus:
controlling access from a first application to a common file system, wherein the common file system is accessible from a plurality of applications;
controlling access, for specifying a second application, based on first identification information and contact communication executed between a first processor of the information processing apparatus and a second processor, wherein the first identification information is associated with each of the plurality of applications; and controlling access, for specifying a third application related to contactless communication, based on second identification information and the contactless communication, wherein a contactless communication device executes the contactless communication with the second processor, and wherein second identification information is associated with at least one application among the plurality of applications.

7. The information processing apparatus according to claim 1, wherein the first identification information and the second identification information are different.

8. A non-transitory computer-readable medium having stored thereon, computer-executable instructions which, when executed by an information processing device, cause the information processing device to execute operations, the operations comprising:

controlling access from a first application to a common file system, wherein the common file system is accessible from a plurality of applications, controlling access, for specifying a second application, based on first identification information and contact communication between a first processor of the information processing device and a second processor, wherein the first identification information is associated with each of the plurality of applications; and controlling access, for specifying a third application related to contactless communication, based on second identification information and the contactless communication, wherein a contactless communication device executes the contactless communication with an external device, and wherein the second identification information is associated with at least one application among the plurality of applications.

* * * * *